(12) United States Patent
Lingafelt et al.

(10) Patent No.: US 7,047,303 B2
(45) Date of Patent: May 16, 2006

(54) APPARATUS AND METHOD FOR USING A NETWORK PROCESSOR TO GUARD AGAINST A "DENIAL-OF-SERVICE" ATTACK ON A SERVER OR SERVER CLUSTER

(75) Inventors: C. Steven Lingafelt, Durham, NC (US); Daniel Edward McConnell, Raleigh, NC (US); Francis E. Noel, Jr., Durham, NC (US); Charles J. Sannipoli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 09/915,611

(22) Filed: Jul. 26, 2001

(65) Prior Publication Data

US 2003/0023733 A1 Jan. 30, 2003

(51) Int. Cl.
*G06F 15/173* (2006.01)
*G06F 7/58* (2006.01)
*G06F 17/30* (2006.01)
*G06F 9/32* (2006.01)
*G06F 15/16* (2006.01)
*G06F 7/04* (2006.01)
*G06F 17/00* (2006.01)
*G06F 9/00* (2006.01)
*G06F 19/00* (2006.01)

(52) U.S. Cl. ............ 709/229; 709/224; 709/226; 709/235; 726/3; 726/13; 726/14

(58) Field of Classification Search ........ 709/223–235; 716/3, 11–14, 22, 23
See application file for complete search history.

(56) References Cited

U.S. PATENT DOCUMENTS

| | | | | |
|---|---|---|---|---|
| 5,606,668 A | * | 2/1997 | Shwed | 713/201 |
| 5,701,465 A | * | 12/1997 | Baugher et al. | 707/10 |
| 5,751,964 A | * | 5/1998 | Ordanic et al. | 709/224 |
| 5,796,633 A | * | 8/1998 | Burgess et al. | 702/187 |
| 5,805,801 A | * | 9/1998 | Holloway et al. | 713/201 |

(Continued)

FOREIGN PATENT DOCUMENTS

GB 2365726 A * 2/2002

OTHER PUBLICATIONS

Strother, Elizabeth. "Denial of Service Protection: The Nozzle", ACSAC '00 Annual Conference in Computer Security Applications, Dec. 11-15, 2000. pp. 32-41.*

(Continued)

*Primary Examiner*—Jason Cardone
*Assistant Examiner*—Melvin H. Pollack
(74) *Attorney, Agent, or Firm*—Douglas W. Cameron; Anne Vachon Dougherty (57) ABSTRACT

A system comprising a network resource server or a server farm formed by a plurality of computer systems and a network processor which transfers data exchanged with an external network supported by the server farm at a data rate substantially the same as the data flow rate of the network and related method. The network processor protects the network resource server against attacks such as a denial of service attack by monitoring data flow, computing a derivative of the data flow over time to determine the rate of change of data flow, and modifying instructions for the discarding of packets in response to rates of change which are outside predetermined boundaries.

28 Claims, 6 Drawing Sheets

U.S. PATENT DOCUMENTS

| | | | |
|---|---|---|---|
| 5,826,014 A * | 10/1998 | Coley et al. | 713/201 |
| 5,991,881 A * | 11/1999 | Conklin et al. | 713/201 |
| 6,067,620 A * | 5/2000 | Holden et al. | 713/155 |
| 6,088,804 A * | 7/2000 | Hill et al. | 713/201 |
| 6,108,310 A * | 8/2000 | Wilkinson et al. | 370/252 |
| 6,178,460 B1 * | 1/2001 | Maddalozzo et al. | 709/239 |
| 6,182,227 B1 * | 1/2001 | Blair et al. | 713/201 |
| 6,233,618 B1 * | 5/2001 | Shannon | 709/229 |
| 6,243,360 B1 * | 6/2001 | Basilico | 370/231 |
| 6,289,462 B1 * | 9/2001 | McNabb et al. | 713/201 |
| 6,463,454 B1 * | 10/2002 | Lumelsky et al. | 718/105 |
| 6,499,107 B1 * | 12/2002 | Gleichauf et al. | 713/201 |
| 6,675,211 B1 * | 1/2004 | Mamaghani et al. | 709/224 |
| 6,687,732 B1 * | 2/2004 | Bector et al. | 709/200 |
| 6,725,378 B1 * | 4/2004 | Schuba et al. | 713/201 |
| 6,735,702 B1 * | 5/2004 | Yavatkar et al. | 713/201 |
| 6,738,814 B1 * | 5/2004 | Cox et al. | 709/225 |
| 6,742,123 B1 * | 5/2004 | Foote | 726/22 |
| 6,751,668 B1 * | 6/2004 | Lin et al. | 709/227 |
| 6,772,334 B1 * | 8/2004 | Glawitsch | 713/153 |
| 6,775,657 B1 * | 8/2004 | Baker | 706/45 |
| 6,789,203 B1 * | 9/2004 | Belissent | 713/201 |
| 6,801,503 B1 * | 10/2004 | Wetherall et al. | 370/235 |
| 6,816,910 B1 * | 11/2004 | Ricciulli | 709/237 |
| 6,901,517 B1 * | 5/2005 | Redmore | 726/11 |
| 6,904,459 B1 * | 6/2005 | Alam et al. | 709/223 |
| 6,928,549 B1 * | 8/2005 | Brock et al. | 713/194 |
| 6,944,673 B1 * | 9/2005 | Malan et al. | 709/237 |
| 6,957,258 B1 * | 10/2005 | Maher et al. | 709/224 |
| 6,965,574 B1 * | 11/2005 | Cook et al. | 370/252 |
| 6,965,922 B1 * | 11/2005 | Holland et al. | 709/213 |
| 2002/0101819 A1 * | 8/2002 | Goldstone | 370/229 |
| 2002/0107953 A1 * | 8/2002 | Ontiveros et al. | 709/224 |
| 2002/0108059 A1 * | 8/2002 | Canion et al. | 713/201 |
| 2002/0131366 A1 * | 9/2002 | Sharp et al. | 370/235 |
| 2002/0133586 A1 * | 9/2002 | Shanklin et al. | 709/224 |
| 2002/0147925 A1 * | 10/2002 | Lingafelt et al. | 713/201 |
| 2002/0169982 A1 * | 11/2002 | Brock et al. | 713/201 |
| 2002/0174220 A1 * | 11/2002 | Johnson | 709/224 |
| 2002/0184362 A1 * | 12/2002 | Banerjee et al. | 709/224 |
| 2003/0009554 A1 * | 1/2003 | Burch et al. | 709/224 |

OTHER PUBLICATIONS

Kent, Stephen. "On the Trail of Intrustions into information Systems," IEEE Spectrum, vol. 37, Issue 12, Dec. 2000, pp. 52-56.*

Senie, D. "Changing the Default for Directed Broadcasts in Routers," RFC 2644, Aug. 1999.*

Ferguson, P. "Network Ingress Filtering: Defeating Denial of Service Attacks Which Employ IP Source Address Spoofing," RFC 2827, May 2000.*

* cited by examiner

APPARATUS AND METHOD FOR USING A NETWORK PROCESSOR TO GUARD AGAINST A "DENIAL-OF-SERVICE" ATTACK ON A SERVER OR SERVER CLUSTER

FIELD OF THE INVENTION

The invention relates to network communications and more particularly to apparatus and a method for guarding against denial of service attacks on a server cluster.

RELATED APPLICATIONS

The interested reader is referred, for assistance in understanding the inventions here described, to the following prior disclosures which are relevant to the description which follows and each of which is hereby incorporated by reference into this description as fully as if here repeated in full:

U.S. patent application Ser. No. 09/384,691 filed 27 Aug. 1999 and entitled "Network Processor Processing Complex and Methods";

U.S. patent application Ser. No. 09/384,744 filed 27 Aug. 1999 and entitled "Network Processor, Memory Organization and Methods";

U.S. patent application Ser. No. 09/448,190 filed 23 Nov. 1999 and entitled "Method and System for Providing Optimal Discard Fraction";

U.S. patent application Ser. No. 09/551,707 filed 18 Apr. 2000 and entitled "Server Cluster Interconnection Using Network Processor"; and U.S. patent application Ser. No. 09/551,822 filed 18 Apr. 2000 and entitled "Data Flow Pattern Recognition and Manipulation".

BACKGROUND OF THE INVENTION

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than those that existed just a few years ago.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company, or between companies, could communicate simultaneously over a network with a software application running on a single computer system.

One significant computer network that has recently become very popular is the Internet. The Internet grew out of the modern proliferation of computers and networks, and has evolved into a sophisticated worldwide network of linked computer systems containing web pages. This system of communication networks and computer systems collectively make up the "world-wide web", or "WWW". A user at an individual PC (i.e., workstation) that wishes to access the WWW typically does so using a software application known as a web browser. A web browser makes a connection via the Internet to computers known as web servers, and receives information from the web servers that is displayed on the user's workstation. Information displayed to the user is typically organized into pages that are constructed using a specialized language called Hypertext Markup Language (HTML). Web browsers that use HTML are now available for almost every computer system on the market, making the WWW accessible to practically anyone who has access to a computer and a modem. Although the WWW is becoming increasingly popular, the rapid growth and expansion of computer users accessing the WWW has brought along with it concomitant problems. Some of these problems are identified in this discussion.

One outgrowth of the world wide web are server farms. The use of the term "farm" is intended to communicate that a number of devices are operatively coupled together in such a way that data may flow more or less seamlessly between the end users to any of the cooperating devices in the farm. Thus a plurality of server computer systems cooperate to divide the data-handling demands of a network. While the technology to perform such a division of function is available or is under development, problems can arise in such environments which are addressed and overcome by the invention here described. It is to be noted that the invention described hereinafter has utility in connection with a single server system as well as in a server farm. For that reason, the term "farm" will occasionally be used here to refer to a single server computer system.

The description which follows presupposes knowledge of network data communications and of the switches and routers which are used in such communications networks. In particular, the description presupposes familiarity with the OSI model of network architecture which divides network operation into layers. A typical architecture based upon the OSI model extends from Layer 1 (also sometime identified as "L1") as the physical pathway or media through which signals are passed upwards through Layers 2–7, the last mentioned being the layer of applications programming running on a computer system linked to the network. In this document, mention of L1, L2 and so forth is intended to refer to the corresponding layer of a network architecture. The disclosure also presupposes a fundamental understanding of bit strings known as packets, frames, and cells and their handling in network communication. On the latter point, the disclosure presupposes knowledge of certain technology by which such bit strings are passed through queues provided in communication devices and computer system memory under the control of enqueuing managers. Queue management includes, in previously known processes which have come to be identified as RED and BLUE, determining the level of enqueued data maintained in a queue and determining the so-called offered rate of data moving to the queue. More discussion of this technology follows later in this disclosure.

One particular problem, addressed here, arises out of willful attempts to deny to users the resources of a particular server or server farm. A now-classic form of such an attempt is known as a "denial of service" or DOS attack. A DOS attack is typically orchestrated by an individual or group wishing to interfere with the availability of a network resource such as a subscriber service or a particular web site or data base. The attacker, using whatever resources can be marshaled, causes a rapidly-increasing number of calls to the resource to be transmitted over the network (e.g., the internet) through which the resource is linked. Where the responsiveness of the server supporting the resource is limited (as it inevitably is), a large number of demands presented nearly simultaneously will cause an overload and cause the server to either slow down its response time or, in many cases, "go down" or become unavailable. In some instances, restoring availability of the resource, or "bringing the server(s) back up", can consume hours and person-days of technical support personnel.

It is therefore an object of the present invention to provide a system and method for facilitating the protection of a server computer system or a plurality of server computer systems joined in a server farm.

SUMMARY OF THE INVENTION

The foregoing and other objects are realized by the present invention wherein a network processor is interposed between the server(s) and the network and used to detect and defuse a DOS attack. The network processor protects the network resource server against attacks such as a denial of service attack by monitoring data flow, computing a derivative of the data flow over time to determine the rate of change of data flow, and modifying instructions for the discarding of packets in response to rates of change which are outside predetermined boundaries.

BRIEF DESCRIPTION OF THE DRAWINGS

The invention will now be described in greater detail with specific reference to the appended drawings wherein.

DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Before referring to the accompanying Figures, some brief general discussion is deemed appropriate. A Network Processor (NP) is an emerging technology that allows media speed processing and/or analysis of communication packets and decision making based upon that processing or analysis. One frequently-used application provides one or more Network Processors connected via a switching fabric to form a communication product, as a switch or router, which can perform a Gateway function to an external wide area network. The processing done by the Network Processor generally comprises examining the packet contents (typically, the source/destination address pair in the header) and then making switching or routing decisions based on the address pair. This processing is known as "filtering" and the decisions that are made as to how to switch the packet are defined by a set of rules, generally referred to as "filter rules".

Figure 2:
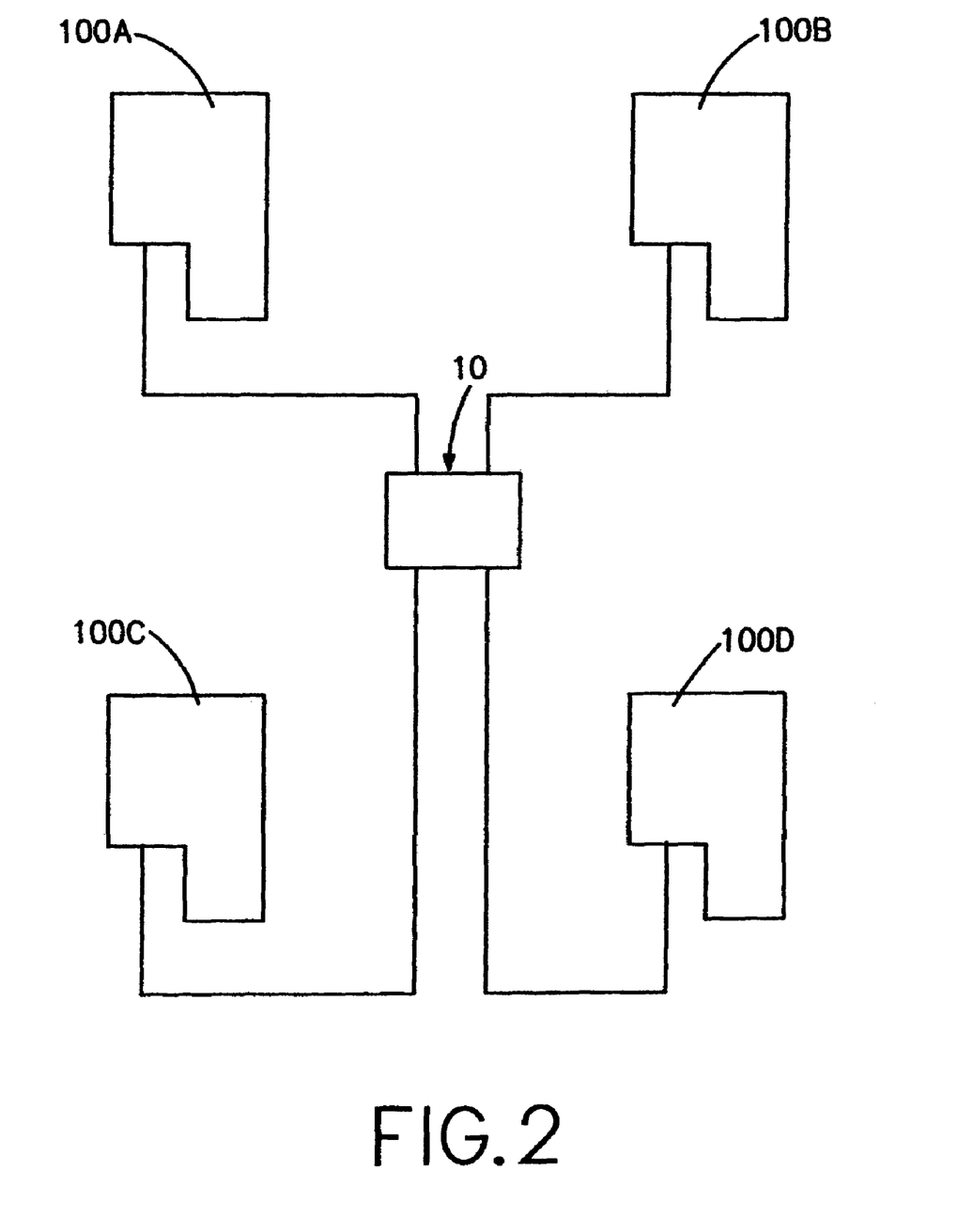
FIG. 2 is a schematic diagram of a server farm formed using a plurality of computer systems as illustrated in FIG. 1 and a network processor as illustrated in FIGS. 3 and 4.

One such application is shown in FIG. 2, where one or more NP's are connected, possibly via a switching fabric, to one or more data processing servers. In this application, the NP is providing the switching function of directing data traffic to various servers, but may also be doing other functions such as encryption and/or decryption, compression and/or decompression, virus detection, etc. This invention also contemplates that the NP(s) may be integrated with the server function.

In all of the scenarios described hereinafter, the primary function of the NP is to filter data flows based on a set of criteria that has been entered into the communication system, usually by an Network Administrator. The network processor then uses these filter rules to direct the flow of traffic. In more advanced applications, class of service filter rules may be invoked to handle some data flows differently in the case of network overload. The description which follows deals with data flows of a single class or type.

As mentioned, when a network communication product acts as a gateway or as an entry to a server or a server farm, the Network Administrator, with the functionality provided by a Network Processor (NP), can set up filter rules that direct the flow of traffic to specific servers, redirect the traffic, or discard traffic, all based on a predefined set of steady state rules. For example, all video traffic may have high priority and may always be routed to a particular high performance server. However, anyone who has worked with the Internet/Intranet has seen occasions where delays have become excessively long because of congestion of a particular class of service to a particular application (e.g., e-mail) which, in the vast majority of the time, is due to a server being unable to respond due to the instantaneous load being placed on the server. In the extreme, attacks on a server, known as denial of service attacks, occur when an individual, or a small group of individuals, send large amounts of requests for service to a particular server, hence denying others the use of the server's resources.

An NP has two unique functions that are applied to this problem in accordance with the invention here described. First, an NP has the ability to use one of its picoprocessors (or it's embedded control point processor) to provide real-time analysis of the data flows. Second, the NP sees both the inbound and outbound traffic flows to/from the server.

The basic function of the NP is to monitor the flow of data packets to a server and impose its set of programmable filters on the flow. As the NP is providing this function, it is capable of monitoring the rate of flow of data packets to specific servers (or ports). To this capability of monitoring flows, the present invention adds the characteristic of using one of its embedded processors to analyze the flow rate by determining the first derivative of the packets per second versus time. Once the NP sees a significant change away from a normal condition (such as a significant increase in the rate of change of a traffic rate) it can impose additional filtering (discarding or rerouting) of packets so that the server does not become overloaded. This is the desired response to a denial of service attack. When the NP sees a significant change toward a normal condition (such as a significant decrease in the rate of change of a traffic rate) then the NP can revert back to the original state of data flow to the server.

An additional refinement on this technique can be accomplished utilizing the capability of the NP to view the outbound stream from a server. In this case, as the inventive NP determines, through it's first derivative analysis, that the rate of change of flow outbound from a server indicates a significant decrease, the NP can impose additional filtering (discard or reroute) on the flows inbound to the server, until such time as flows from the server have returned to normal.

Figure 1:
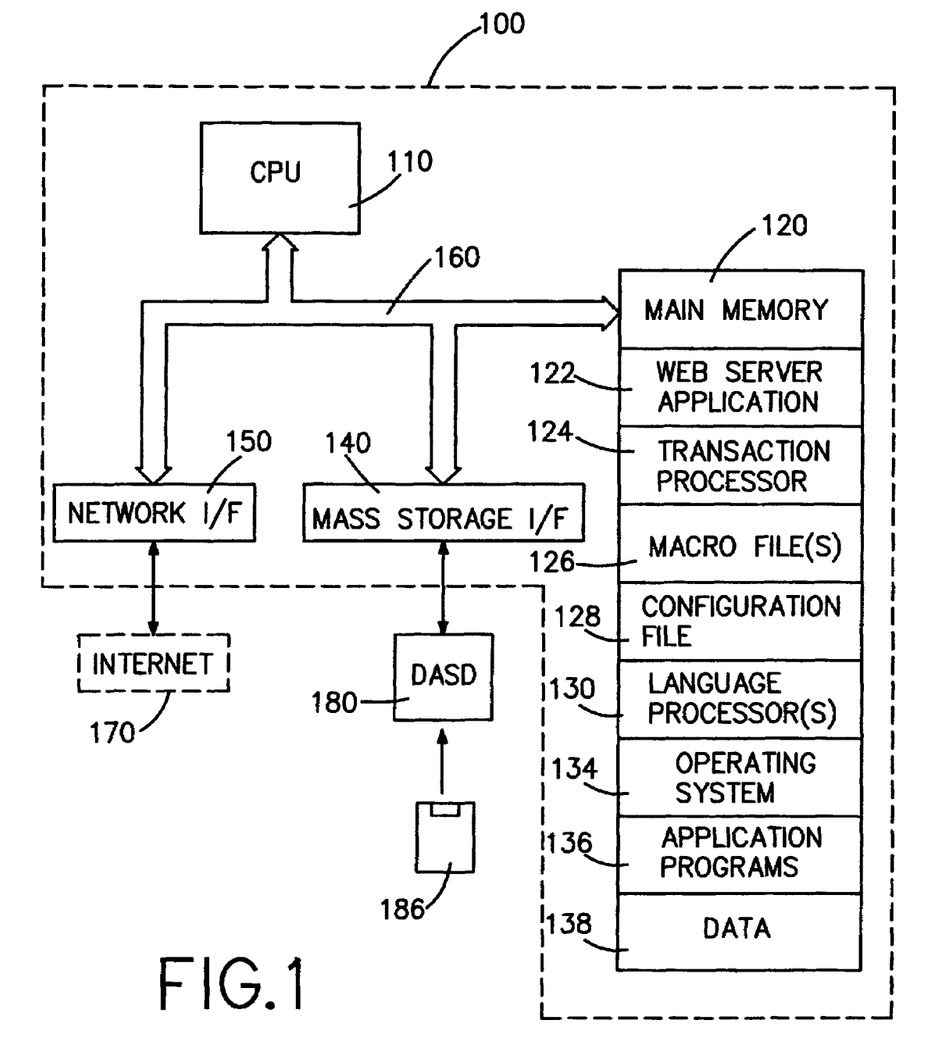
FIG. 1 is a schematic diagram of a computer system in which the present invention may be implemented.

Referring now to FIG. 1 and for completeness, a computer system 100 as contemplated by the present invention includes a central processing unit (CPU) 110, a main memory 120, a mass storage interface 140, and a network interface 150, all connected by a system bus 160. Those skilled in the art will appreciate that this system encompasses all types of computer systems: personal computers, midrange computers, mainframes, etc. Note that many additions, modifications, and deletions can be made to this computer system 100 within the scope of the invention here described. Examples of this (not shown) are a computer monitor, an input keyboard, a cache memory, and peripheral devices such as printers. The present invention may operate as a web server, which is generally implemented with a personal or midrange computer.

CPU 110 can be constructed from one or more microprocessors and/or integrated circuits. CPU 110 executes program instructions stored in main memory 120. Main memory 120 stores programs and data that the computer may access. When computer system 100 starts up, CPU 110 initially executes the operating system 134 program instructions. Operating system 134 is a sophisticated program that manages the resources of the computer system 100. Some of these resources are the CPU 110, main memory 120, mass storage interface 140, network interface 150, and system bus 160.

The main memory 120 includes a web server application 122, a transaction processor 124, one or more macro files 126, a configuration file 128, one or more language processors 130, an operating system 134, one or more application programs 136, and program data 138. Application programs 136 are executed by CPU 110 under the control of operating system 134. Application programs 136 can be run with program data 138 as input. Application programs 136 can also output their results as program data 138 in main memory. When the computer system 100 operates as a web server, CPU 110 executes, among other things, a web server application 122. Transaction processor 124 is a program that processes an HTML page stored in one or more macro files 126. When transaction processor 124 is initialized, it reads configuration file 128 to correlate different types of queries to different language processors 130. When a query of dynamic data is found in a page, transaction processor 124 determines from the configuration data (read from the configuration file) which language processor 130 it should call to process the query. The appropriate language processor 130 then queries a data source, such as memory or a database, to retrieve the dynamic data. Language processor 130 passes the dynamic data to transaction processor 124, which inserts the dynamic data into the HTML data for the selected page.

Mass storage interface 140 allows computer system 100 to retrieve and store data from auxiliary storage devices such as magnetic disks (hard disks, diskettes) and optical disks (CD-ROM). These mass storage devices are commonly known as Direct Access Storage Devices (DASD) and act as a permanent store of information. One suitable type of DASD is a floppy disk drive 180 that reads data from and writes data to a floppy diskette 186. The information from the DASD can be in many forms. Common forms are application programs and program data. Data retrieved through mass storage interface 140 is often placed in main memory 120 where CPU 110 can process it.

While main memory 120 and DASD device 180 are typically separate storage devices, computer system 100 uses well-known virtual addressing mechanisms that allow the programs of computer system 100 to behave as if they only have access to a large, single storage entity, instead of access to multiple, smaller storage entities (e.g., main memory 120 and DASD device 185). Therefore, while certain elements are shown to reside in main memory 120, those skilled in the art will recognize that these are not necessarily all completely contained in main memory 120 at the same time. It should be noted that the term "memory" is used herein to generically refer to the entire virtual memory of computer system 100.

Network interface 150 allows computer system 100 to send and receive data to and from any network the computer system with which it may be connected. This network may be a local area network (LAN), a wide network (WAN), or more specifically the Internet 170. Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), which is used to communicate across the Internet, is an example of a suitable network protocol.

System bus 160 allows data to be transferred among the various components of computer system 100. Although computer system 100 is shown to contain only a single main CPU and a single system bus, those skilled in the art will appreciate that the present invention may be practiced using a computer system that has multiple CPUs and/or multiple buses.

At this point, it is important to note that while the present invention has been (and will continue to be) described in the context of a fully functional computer system, those skilled in the art will appreciate that constituents of the present invention are capable of being distributed as a program product in a variety of forms, and that the present invention applies equally regardless of the particular type of signal bearing media used to actually carry out the distribution. Examples of signal bearing media include: recordable type media such as floppy disks (e.g., 186 of FIG. 1) and CD ROMs (not shown), and transmission type media such as digital and analog communications links.

In the present invention a computer system 100 may be operated as a web server. To do so, a web server application 122 is executed by CPU 110. Another application program 136 may be run simultaneously on computer system 100 assuming that operating system 134 is a multi-tasking operating system. Web servers are generally connected to the Internet 170. As has been discussed, the Internet is a well known computer network that spans the world and is shared by millions of computers. There are many web servers on the Internet. Each computer which is linked to the Internet has its own unique address to enable it to communicate across the network with other computers. Many different types of data can be sent along the Internet. Examples are electronic mail, program data, digitized voice data, computer graphics, and web pages.

Referring now to FIG. 2, a plurality of computer systems 100A, 100B, 100C, and 100D are coupled together through a network processor 10 to form a server farm. The network processor 10 is more fully illustrated and described in FIGS. 3 and 4 and the description of the structure there shown and exemplary operations which follows hereinafter. The computer systems joined together in the farm may have differing assigned functions. For example, one may be designated to serve batch processing requests for data mining of data stored on associated DASD. Another in the same farm may be designated as a mail server. Yet another may be designated for handling real time requests for data stored on associated DASDs. Yet another may be designated as an application server, making available to other systems on the network application programs which may be transferred for transitory or fugitive use on client systems. Alternatively, the systems may be serving as parallel web page host systems and each may be dynamically selected based upon incoming requests for service. Persons knowledgeable in the configuration and use of server farm systems will be able to understand the full range of alternative functions (here briefly indicated) and to develop still further alternatives as the flexibility of this invention becomes recognized. Further, such persons will recognize that a single server computer system may be used rather than the plurality shown in FIG. 2. In such an instance, the "server farm" has a single member.

Data bit streams moving to the server(s) of FIG. 2 from any associated network will pass to the network processor 10. The network processor 10, in accordance with important distinguishing features of this invention, will process network communication protocol bits identified in the incoming bit streams and recognize packets or frames or the like which are assignable to one of the farm system functions 100A, 100B, 100C and 100D based upon the designated service to be provided. After assignment to the appropriate farm system and processing there, the packets, frames or the like are returned to the network processor for forwarding to the associated network after the network processor supplies the appropriate network communication protocol bits.

In accordance with the related invention disclosed in U.S. application Ser. No. 09/551,707, movement of data bit streams to the appropriate one of the farm systems is accomplished at what is known as media speed. That is, the flow rate of data moving to the server system is the same or substantially the same as the flow rate in the network to which the network processor connects the server(s).

The architecture used for apparatus disclosed hereinafter is based on an interface device or network processor hardware subsystem and a software library running on a control point processor. The interface device or network processor subsystem is a high performance frame-forwarding engine designed for parsing and translating L2, L3, and L4 data strings. The interface device or network processor subsystem can provide a fast-path through an apparatus while the software library and control point processor provide management and route discovery functions needed to maintain the fast-path. The control point processor and the software library running thereon together define the Control Point (CP) of the system. The control point processor may be embedded within the network processor or physically separated therefrom.

Industry consultants have defined a network processor as a programmable communications integrated circuit capable of performing one or more of the following functions:
  Packet classification—identifying a packet based on known characteristics, such as address or protocol;
  Packet modification—modifying the packet to comply with IP, ATM, or other protocols (for example, updating the time-to-live field in the header for IP);
  Queue/policy management—packet queuing, de-queuing, and scheduling of packets for specific applications; and
  Packet forwarding—transmission and receipt of data over a switch fabric and forwarding or routing the packet to the appropriate address.

Although this definition is an accurate description of the basic features of early NPs, the full potential capabilities and benefits of NPs are yet to be realized. Network processors can increase the effective system bandwidth and solve latency problems in a broad range of applications by allowing networking tasks which were previously handled in software to be executed in hardware. In addition, NPs can provide speed improvements through architectures, such as parallel distributed processing and pipeline processing designs. These capabilities can enable efficient search engines, increase throughput, and provide rapid execution of complex tasks. The definition uses the word "packet", which is consistent with usage commonly employed when referring to wide area networks (WANS). The inventions here described are equally functional with "frames", a term consistent with usage commonly employed when referring to local area networks (LANs).

Network processors are expected to become a fundamental network building block for networks in the same fashion that CPUs are for PCs. Typical capabilities offered by an NP are real-time processing, security, store and forward, switch fabric, and IP packet handling and learning capabilities.

The processor-model NP incorporates multiple general purpose processors and specialized logic. Integrators are turning to this design to provide scalable, flexible solutions that can accommodate change in a timely and cost-effective fashion. A processor-model NP allows distributed processing at lower levels of integration, providing higher throughput, flexibility and control. Programmability can enable easy migration to new protocols and technologies, without requiring new Application Specific Integrated Circuit (ASIC) designs.

While such a network processor supports multi-layer forwarding in hardware, it can also operate as an L2-only switch and that is its default mode of operation in the simplest form disclosed in related applications. Each port will be put into a single domain allowing any device in the domain to communicate with any other device in the domain. The apparatus is configurable at L2 allowing system administrators the ability to configure features such as; grouping ports into separate domains or trunks, configuring Virtual LAN (VLAN) segments, or imposing filters.

Certain portions of the apparatus described hereinafter are designed as a modular unit using an interface device or network processor (NP) and a Control Point (CP) as its fundamental building blocks. An optional switching fabric device can be used when more than two interface device subsystems are tied together. The optional switching fabric device may be as disclosed in U.S. Pat. No. 5,008,878 issued 16 Apr. 1991 for "High Speed Modular Switching Apparatus for Circuit and Packet Switched Traffic" which is incorporated herein by reference to any extent necessary for an understanding of this invention. The purpose of using the optional switching fabric device would be to increase the number of server systems supported in a farm and/or to increase the rate of data flow to and from the supported server. It is known that a single network processor device can function as an elemental switch, and in certain portions of the discussion hereinafter, the term "switch" is used where the reference is to an NP.

This apparatus may consist of a single assembly of an NP, a CP, and a media interconnection mechanism. However, a more complex apparatus is anticipated to be assembled using printed circuit board elements also here mentioned as "option cards" or "blades". The printed circuit board elements have circuit elements mounted thereon and are received in connectors provided in apparatus housings, such as in server computer system housings. The apparatus contemplates that cards can be exchanged among varying chassis or housings, provided that appropriate connectors and backplane electrical connections are provided in each. A basic component found on many if not all option cards is a carrier subsystem.

In its simplest form, an interface apparatus contemplated by this invention has a control point processor and an interface device operatively connected to the control point processor. Preferably and as here disclosed, the interface device (also here identified as a network processor or NP) is a unitary Very Large Scale Integrated (VLSI) circuit device or chip which has a semiconductor substrate; a plurality of interface processors formed on the substrate; internal instruction memory formed on said substrate for storing instructions accessibly to the interface processors; internal data memory formed on the substrate for storing data passing through the device accessibly to the interface processors; and a plurality of input/output ports. The interface processors are also sometimes herein identified as picoprocessors or processing units. The ports provided include at least one port connecting the internal data memory with external data memory and at least two other ports for exchanging data passing through the interface device with an external device or network under the direction of the interface processors. The control point cooperates with the interface device by loading into the instruction memory instructions to be executed by the interface processors in directing the exchange of data between the data exchange input/output ports and the flow of data through the data memory. It is also contemplated that the functions here described as being performed by elements formed on a single substrate may be distributed over a plurality of substrates, as where a chip set may be used instead of a single chip.

The network processor here disclosed is deemed inventive apart from the assemblies and combinations into which it is incorporated, such as the server farms here described. Further, the network processor is deemed to have within its elements here described other and further inventions not here fully discussed.

Figure 3:
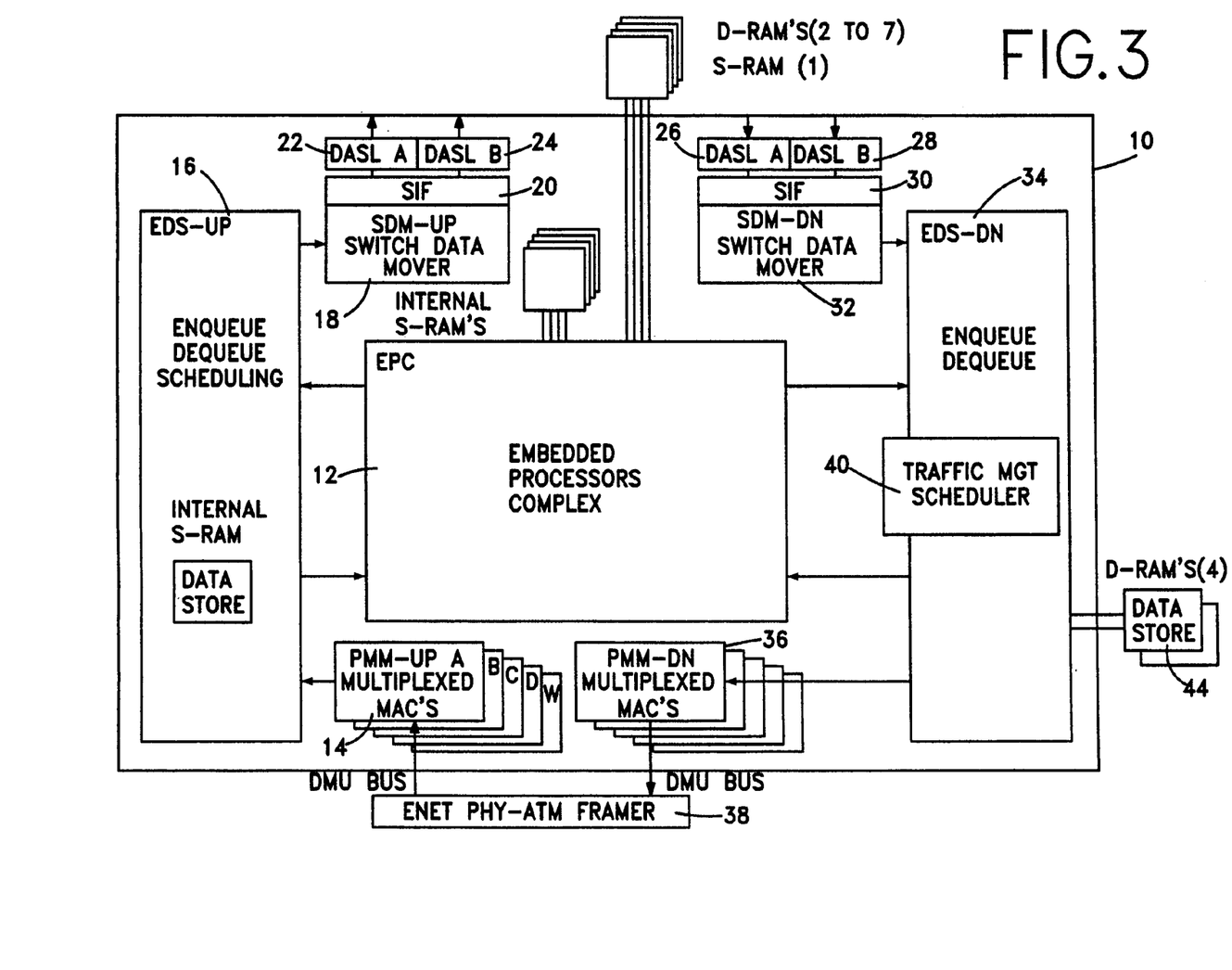
FIG. 3 is a schematic representation of a network processor as used in this invention.

For a more complete understanding, FIG. 3 shows a block diagram for the interface device chip 10 that includes a substrate and a plurality of subassemblies integrated on the substrate. The subassemblies are arranged into an Upside configuration and a Downside configuration. As used herein, "Upside" refers to data flows inbound to the apparatus here disclosed, while "Downside" refers to data outbound from the apparatus to a device or network serviced by the apparatus. The data flow follows the respective configurations. As a consequence, there is an Upside data flow and a Downside data flow. The subassemblies in the Upside include Enqueue-Dequeue-Scheduling UP (EDS-UP) logic 16, multiplexed MAC's-UP (PPM-UP) 14, Switch Data Mover-UP (SDM-UP) 18, System Interface (SIF) 20, Data Align Serial Link A (DASLA) 22, and Data Align Serial Link B (DASLB) 24. A data align serial link is more fully described in copending U.S. patent application Ser. No. 09/330,968 filed 11 Jun. 1999 and entitled "High Speed Parallel/Serial Link for Data Communication" which is incorporated by reference herein to any extent necessary for a full understanding of the invention here disclosed. While the preferred form of the apparatus of this invention here disclosed uses a DASL link, the present invention contemplates that other forms of links may be employed to achieve relatively high data flow rates, particularly where the data flow is restricted to being within the VLSI structure.

The subassemblies in the downside include DASL-A 26, DASL-B 28, SIF 30, SDM-DN 32, EDS-DN 34, and PPM-DN 36. The chip also includes a plurality of internal S-RAMs 15, 17, Traffic Mgt Scheduler 40, and Embedded Processor Complex (EPC) 12. An interface device 38 is coupled by respective DMU Busses 35, 37 to PMM 14 and 36. The interface 38 could be any suitable L1 circuitry, such as Ethernet Physical (ENET PHY), ATM Framer, IP over SONET, etc. The type of interface is dictated in part by the network media or other device to which the chip is connected. A plurality of external D-RAMs and S-RAMs are available for use by the chip.

Figure 4:
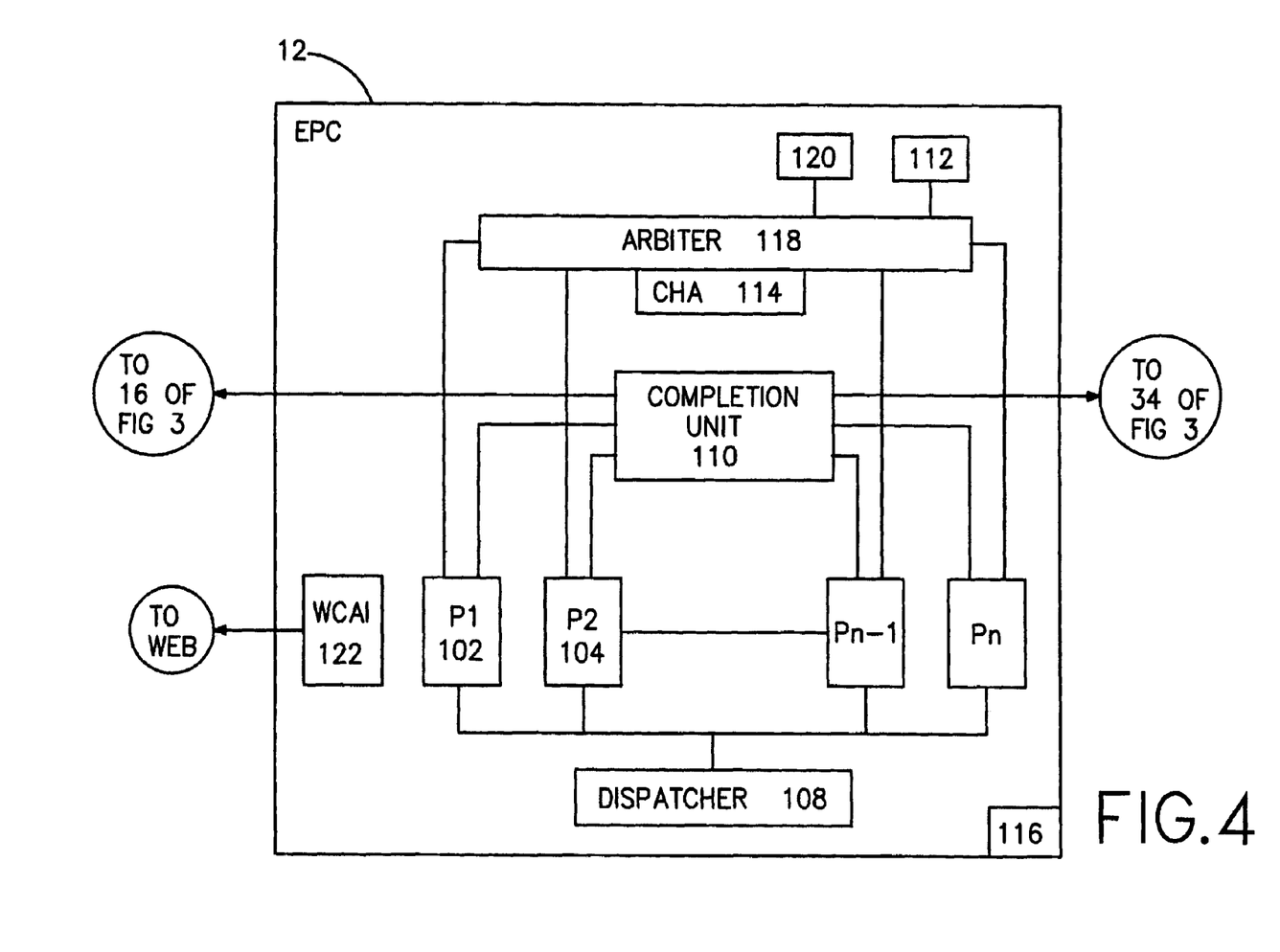
FIG. 4 is another schematic representation of a network processor as used in this invention.

The arrows show the general flow of data within the interface device. For example, frames received from a MAC are placed in internal Data Store buffers by the EDS-UP. These frames are identified as either normal Data Frames or system control Guided Frames and are enqueued to the EPC. The EPC contains N protocol processors capable of working on up to N frames in parallel (N>1). In a representative embodiment as illustrated in FIG. 4 with multiple protocol processors ($P_1$–$P_n$), two of the protocol processors are specialized; one for handling Guided Frames (the Generic Central Handler or GCH) 102 and one for building Lookup Data in Control Memory (the Generic Tree Handler or GTH) 104. The EPC also contains a dispatcher 108 which matches new frames with idle processors, a Completion Unit 110 which maintains frame sequence, a Common Instruction Memory (CIM) 112 shared by all ten processors, a Classifier Hardware Assist (CHA) 114 which determines frame classification and its coprocessor (not shown) which helps determine the starting instruction address of the frame, Ingress and Egress Data Store (IEDS) Interfaces 116 which control read and write operations of frame buffers, a Control Memory Arbiter (CMA) 118 which allows the ten processors to share Control Memory 120, a Web Control, Arbiter and Interface (WCAI) 122 that allows debug access to internal Interface device data structures, as well as other hardware constructs.

Guided Frames are sent by the dispatcher to the GCH processor 102 as it becomes available. Operations encoded in the Guided Frame are executed, such as register writes, counter reads, MAC configuration changes, and so on. Lookup table alterations, such as adding MAC or IP entries, are passed on to the Lookup Data processor 104 for Control Memory operations, such as memory reads and writes. Some commands, such as MIB counter reads, require a response frame to be built and forwarded to the appropriate port on the appropriate Interface device 116. In some cases, the Guided Frame is encoded for the Egress side of Interface device. These frames are forwarded to the Egress side of the Interface device being queried, which then executes the encoded operations and builds any appropriate response frame.

Data frames are dispatched to the next available protocol processor for performing frame lookups. Frame data are passed to the protocol processor along with results from the Classifier Hardware Assist (CHA) Engine 114. The CHA parses IP or IPX. The results determine the Tree Search algorithm and starting Common Instruction Address (CIA). Tree Search algorithms which are supported included Fixed Match Trees (fixed-size patterns requiring exact match, such as Layer 2 MAC tables), Longest prefix Match Trees (variable-length patterns requiring variable-length matches, such as subnet IP forwarding) and Software Managed Trees (two patterns defining either a range or a bit mask set, such as are used for filter rules).

Lookup is performed with the aid of the Tree Search Engine (TSE) Coprocessor, which is a part of each protocol processor ($P_1$–$P_n$). The TSE Coprocessor performs Control memory accesses, freeing the protocol processor to continue execution. Control Memory stores all tables, counters, and other data needed by the picocode. Control memory operations are managed by the Control Memory Arbiter 118, which arbitrates memory access among the ten processor complexes.

Frame data are accessed through the Data Store Coprocessor (not shown). The Data Store Coprocessor contains a primary data buffer (holding up to eight 16 byte segments of frame data), a scratch pad data buffer (also holding up to eight 16-byte segments of frame data) and some control registers for Data Store operations. Once a match is found, ingress frame alterations may include a VLAN header insertion or overlay. This alteration is not performed by the interface device processor complex; however, hardware flags are derived and other Ingress Switch Interface hardware performs the alterations. Other frame alterations can be accomplished by the picocode and the Data Store Coprocessor by modifying the frame contents held in the Ingress Data Store.

Egress Tree Searches support the same algorithms as supported for Ingress Searches. Lookup is performed with the TSE Coprocessor, freeing the protocol processor to continue execution. All Control memory operations are managed by the Control Memory Arbiter 118, which allocates memory access among the ten processor complexes. Egress frame data are accessed through the Data Store Coprocessor. As discussed above, the Data Store Coprocessor contains a primary data buffer (holding up to eight 16-byte segments of frame data), a scratch pad data buffer (also holding up to eight 16-byte segments of frame data) and some control registers for Data Store operations. The result of a successful lookup contains forwarding information and, in some cases, frame alteration information. Frame alterations can include VLAN header deletion, Time to Live increment or decrement, IP Header Checksum recalculation, Ethernet frame CRC overlay or insertion and MAC DA/SA overlay or insertion. IP Header checksums are prepared by the Checksum Coprocessor. Alterations are not performed by the Interface device Processor Complex; but rather, hardware flags are created and PMM Egress hardware performs the alterations. Upon completion, an Enqueue Coprocessor is used to help build the necessary formats for enqueuing the frame in the EDS Egress queues and sending them to the Completion Unit 110. The Completion Unit 110 guarantees frame order from the ten protocol processors to the EDS Egress queues feeding the egress MACs shown in FIG. 3. The completed frames are finally sent by PMM Egress hardware to the MACs and out the ports.

The Tree Search Engine coprocessor provides memory range checking, provides illegal memory access notification, and performs tree search instructions (such as memory read, write or read-add-write) operating in parallel with protocol processor execution. The Dispatcher 108 controls the passing of frames to the ten protocol processors and manages interrupts and timers. The Completion Unit 110 guarantees frame order from the processor complex to target port queues. A rich instruction set includes conditional execution, packing (for input hash keys), conditional branching, signed and unsigned operations, counts of leading zeros, and more.

The Classifier Hardware Assist engine 114 passes each frame's Layer 2 and Layer 3 protocol header and provides this information with frames as they are dispatched to the protocol processors. The Control Memory Arbiter 118 controls processor access to both internal and external memory. Egress frames may be stored in either one External Data Buffer (e.g. DS0) or two External Data Buffers, 44 of FIG. 3. Each Buffer can be comprised of a pair of 2M×16 bit×4 bank DDR DRAM (storing up to 256K 64-byte frames) or a pair of 4M×16 bit×4 bank DDR DRAM (storing up to 512K 64-byte frames). Choose the single External Data Buffer (e.g. DS0) for 2.28 Mbps or add the second Buffer (e.g. DS1) to support 4.57 Mbps Layer 2 and Layer 3 switching. Adding the second Buffer improves performance, but it does not increase frame capacity. The External Data Buffer interface runs at a 133 MHz clock rate with a 266 MHz data strobe and supports configurable CAS latency and drive strength.

Fixed Frame alterations include VLAN tag insertions in the Ingress direction and VLAN tag deletions, Time To Live increment/decrement, Ethernet CRC overlay/insert and MAC DA/SA overlay/insert in the Egress direction.

Port mirroring allows one receive port and one transmit port to be copied to a system designated observation port without using protocol processor resources. Mirrored Interface device ports are configured to add frame and switch control data. A separate data path allows direct frame enqueuing to the Ingress Switch interface.

The network processor operates under rules which are dynamically loaded into the picoprocessors from the control point processor. Those rules may be changed "on-the-fly" to accommodate changing conditions. It is this capability of the network processor which is used to advantage in the present invention.

What follows next is a somewhat extensive discussion of queue management strategies which have been implemented. This discussion is intended as a representation of the capabilities of a type of filter rule set which can be useful in guarding against a DOS attack, and will include descriptions of technology both known and in general use and proprietary.

As briefly mentioned above, methods have been developed in order to control traffic flowing through a data path switch such as an NP so as to improve performance of the network in which the switch is used. In particular, a conventional method known as RED (Random Early Discard or Detection) is used. This conventional method is typically used by an enqueuing mechanism to control the traffic through a corresponding queue.

At the end of a short period of time, known as an epoch, a queue level of the queue for the epoch is determined by the enqueuing mechanism. Note that the determined queue level could be an average queue level for the epoch. In addition, the determined queue level could be the total level for the memory resource of which the queue is a part. It is then determined if the queue level is above a minimum threshold. If the queue level is not above the minimum threshold, then a conventional transmission fraction is set. The transmission fraction determines the fraction of packets that will be transmitted in the next epoch. The conventional discard fraction determines the fraction of packets that will be dropped. The conventional discard fraction is equal to one minus the conventional transmission fraction. A transmission fraction of one thus indicates that all packets should be transmitted and none should be dropped.

If it has been determined that the queue level is above the minimum threshold, then it is next determined whether the queue level for the epoch is above a maximum threshold. If the queue level is above the maximum threshold, then the conventional transmission fraction is set to zero and the conventional discard fraction set to one. If the queue level is not above the maximum threshold, then the conventional discard fraction is set to be proportional to the queue level of the previous epoch divided by a maximum possible queue level or, alternatively, to some other linear function of the queue level. Thus, the conventional discard fraction is proportional to the fraction of the queue that is occupied or some other linear function of the queue level. The conventional transmission is also set to be proportional to one minus the conventional discard fraction. The conventional transmission fraction and the conventional discard fraction are then utilized for the next epoch to randomly discard packets. Thus, when the queue level is below the minimum threshold, all packets will be transmitted by the enqueuing mechanism to the queue during the next epoch. When the queue level is above a maximum threshold, then all packets will be discarded by the enqueuing mechanism during the next epoch or enqueued to a discard queue. When the queue level is between the minimum threshold and the maximum threshold, then the fraction of packets discarded by the enqueuing mechanism is proportional to the fraction of the queue that is occupied or some other linear function of the queue level. Thus, the higher the queue level, the higher the fraction of packets discarded. In addition, a notification may be provided to the sender of discarded packets, which causes the sender to suspend sending additional packets for a period of time. The individual packets which are selected for discarding may also be randomly selected. For example, for each packet, the enqueuing mechanism may generate a random number between zero and one. The random number is compared to the conventional discard fraction. If the random number is less than or equal to the conventional discard fraction, then the packet is dropped. Otherwise, the packet is transmitted to the queue. This process of discarding packets based on the transmission fraction is continued until it is determined that the epoch has ended. When the epoch ends, the method commences again to determine the conventional transmission fraction for the next epoch and to drop packets in accordance with the conventional transmission fraction during the next epoch.

Because packets can be discarded based on the queue level, the RED method allows some control over the traffic through a switch. As a result, fewer packets may be dropped due to droptail than in a switch which does not have any mechanism for discarding packets before the queue becomes full. Droptail occurs when packets must be dropped because a queue is full. As a result, there is no opportunity to account for the packet's priority in determining whether to drop the packet. Furthermore, in some situations, the method can reduce the synchronization of hosts sending packets to the switch. This occurs because packets may be dropped randomly, based on the conventional transmission fraction, rather than dropping all packets when the queue level is at or near the maximum queue level. Performance of the switch is thus improved over a switch that does not utilize method RED, that is, a switch that simply drops next arriving packets when its buffer resources are depleted.

Although the RED method improves the operation of the switches, one of skill in the art will readily realize that in many situations, the RED method fails to adequately control traffic. Despite the fact that packets, or cells, may be dropped before the queue becomes full, the hosts tend to become synchronized in some situations. This is particularly true for moderate or higher levels of congestion of traffic. The conventional transmission fraction is based on the queue level. However, the queue level may not be indicative of the state of the switch. For example, a queue level below the minimum threshold could be due to a low level of traffic (a low number of packets passing through the device). However, a low queue level could also be due to a large number of discards in the previous epoch because of high traffic. If the low queue level is due to a low traffic level, increasing the conventional transmission fraction is appropriate. If the low queue level is due to a high discard fraction, increasing the conventional transmission fraction may be undesirable. The conventional RED method does not distinguish between these situations. As a result, the conventional transmission fraction may be increased when it should not be. When this occurs, the queue may become rapidly filled. The transmission fraction will then be dropped, and the queue level will decrease. When the queue level decreases, the transmission fraction will increase, and the queue may become filled again. The switch thus begins to oscillate between having queues full and queues empty. As a result, the average usage of the switch becomes quite low and the performance of the network using the switch suffers.

Another method is known as BLUE. The BLUE method takes into account not only the queue level, but also the transmission rate and the offered rate. The offered rate is the rate at which packets or cells are offered to the enqueuing mechanism for provision to the corresponding queue. The BLUE method will be described using an enqueuing mechanism and queue. The queue level for the queue, the transmission fraction provided to the queue by the enqueuing mechanism, and the offered rate are determined for the epoch which just ended. The offered rate is the rate at which packets are provided to the enqueuing mechanism. Thus, the offered rate could come from flows of traffic provided by one or more ports.

It is then determined whether there is a packet loss or a queue level greater than some threshold. Either event indicates that the discard fraction should be increased. If so, then the discard fraction is incremented by a first constant amount that may be empirically determined. Thus, the transmission fraction, which is one minus the discard fraction, is decreased. If it is determined that the discard fraction should not be increased, then it is decided whether the discard fraction should be decreased. The discard fraction should be decreased if the queue level is low or if the offered rate is low. If the discard fraction should be decreased, then such is accomplished by subtracting a second constant amount that may also be empirically determined. Either the discard fraction (if changed) or the old discard fraction is then used to determine the fraction of packets to be transmitted to the queue during the next epoch. Thus, packets may be discarded randomly or by taking into account each packet's priority. It is thus ensured that the correct discard fraction and, therefore, the correct transmission fraction are maintained. It is next determined whether the epoch has ended. For further details on BLUE, the website http://www.eecs.umich.edu/usuchang/blue/ can be consulted.

Although method BLUE works well for its intended purpose and is an improvement over method RED, one of skill in the art will readily realize that method BLUE may take a relatively long time to reach a stable state. Thus, although performance is improved over method RED, performance of the network may still be poorer than what is desired.

Yet another method which is an alternative to methods RED and BLUE will now be described. This third method may be used in conjunction with a system in which multiple queues are part of the same memory resource. However, nothing prevents method THREE from being used in another system in which each queue has a separate memory resource.

In method THREE, the queue level and offered rate are determined for the previous epoch. The queue level is preferably determined relative to a minimum queue level, $Q_{min}$, and a maximum queue level, $Q_{max}$, at the end of the epoch. The transmission fraction for the previous epoch is also available.

It is then determined whether the queue level is above $Q_{min}$. If not, then the transmission fraction is set to one, thereby ensuring that all packets will be transmitted by the enqueuing mechanism to the queue if the queue level is low enough. If it has been determined that the queue level is above $Q_{min}$, then it is next determined whether the queue level is above $Q_{max}$. If the queue level is above $Q_{max}$, then the transmission fraction is set to zero. This step ensures that all packets will be discarded if the queue level is too high.

If the queue level is neither below $Q_{min}$ nor above $Q_{max}$, then the transmission fraction is controlled for critical damping. The derivation of critical damping using stability theory is discussed in a related co-pending Ser. No. 09/448,190 application in which a mathematical illustration is given in full.

The transmission fraction can be set for critical damping using method THREE. Preferably critical damping occurs only in a desired range of queue levels. Outside of this range, the transmission fraction is set to zero or one, depending on whether the queue level is determined to be too high or too low for a critical damping calculation. Because packets can be discarded randomly or based at least in part on their priority, synchronization of hosts sending traffic to the switch can be prevented. Because critical damping is provided, method THREE can provide better stability for the system than method RED and will reach equilibrium more rapidly than method BLUE.

The present invention adds, to a method such as method RED, BLUE or THREE, the characteristic of calculating a first derivative of packet flow during successive epochs and then changing the filter rules applied depending upon whether the first derivative is, within certain boundaries, established as being indicative of the service capabilities of the server to which data flow is addressed. When the first derivative indicates that the demands being placed on the server will shortly exceed the service capabilities, then the filter rules applied increase the discard of packets. As the derivative indicates that the demands being placed on the server are returning to a level within the boundaries of service capabilities, then discard rates are reduced. That is, more traffic is handled. These characteristics are shown symbolically in FIGS. 5 and 6, where the flow of operations is illustrated. The present invention contemplates that a network processor used in accordance with this invention may implement one, the other, or both of the processes there illustrated.

Figure 5:
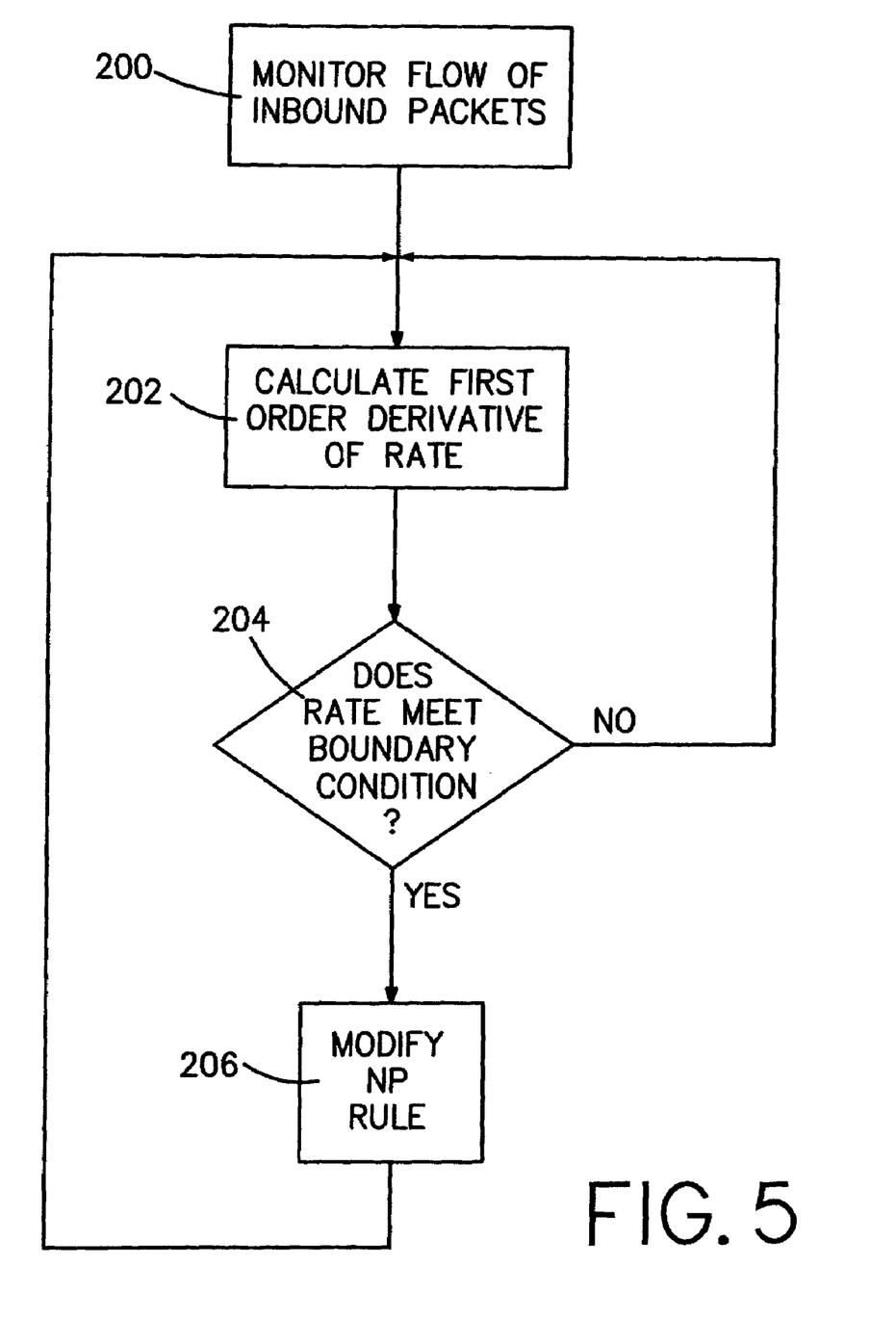
FIG. 5 illustrates the steps executed in preventing successful assertion of a denial of service attack by monitoring inbound packets in accordance with this invention.
Figure 6:
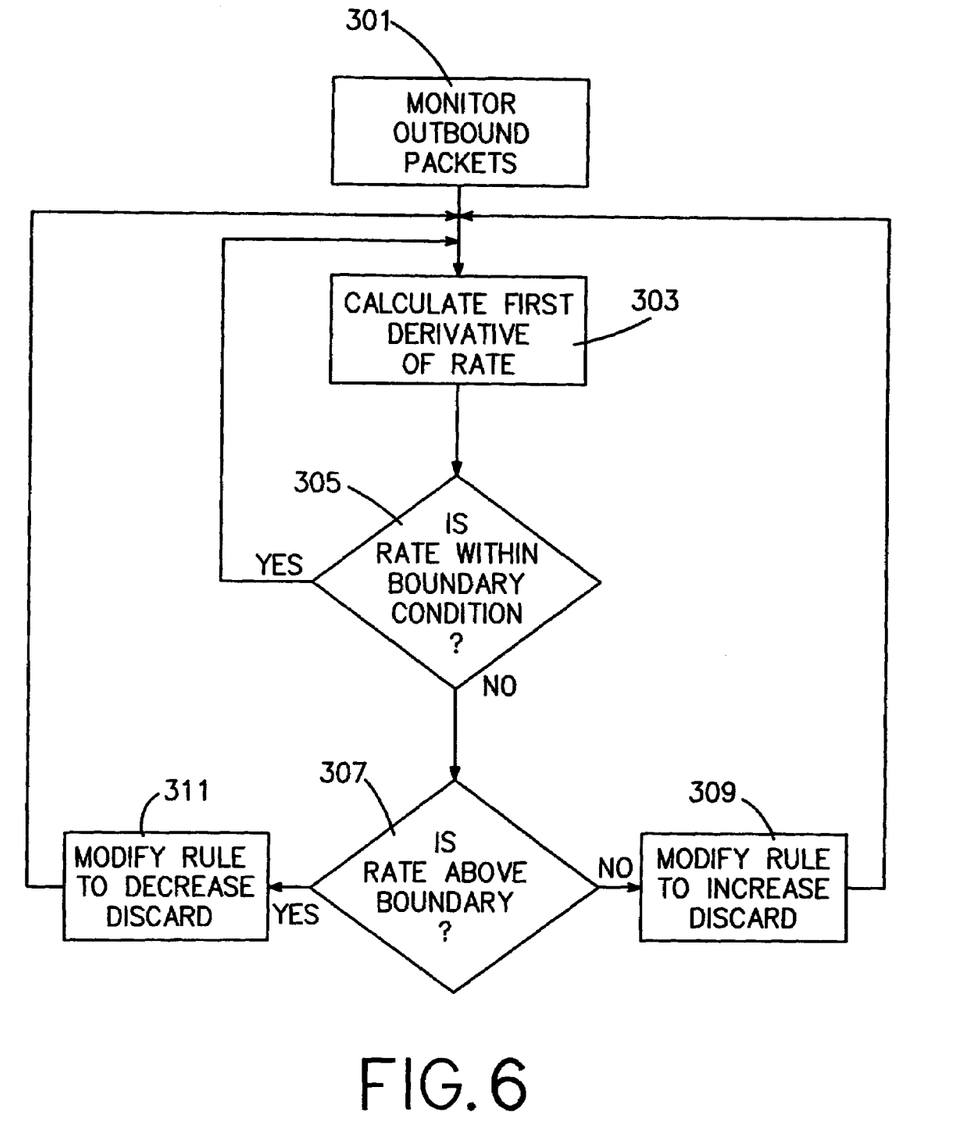
FIG. 6 illustrates the steps executed in preventing successful assertion of a denial of service attack by monitoring outbound packets in accordance with this invention.

Referring now to FIG. 5, the NP 10 in a system as shown in FIG. 2 monitors the flow of packets to particular addresses during epochs at step 200. A first order derivative (in the Figure, Rate Of Change or ROC) of flow rate during successive epochs is calculated by application of algorithmic rules at step 202. The computed rate of change is then compared with predetermined boundary conditions at step 204. If the rate of change of inbound packet flow exceeds an established boundary condition (set by the data flow handling capability of the addressed server resource), then the NP rule set is modified at step 206 to increase the discard of inbound packets or redirect the packets to a predetermined acceptable alternative network resource. If the rate of change of inbound packet flow is below the upper boundary condition, then the system returns to step 204. Subsequent to the modification of the rule set following step 206, the system returns to the calculation of a derivative at step 202 and, when the rate of change of inbound packet flow drops below a second boundary condition, as determined at 204, the NP rule set is modified to restore normal data flow by decreasing discard of packet in step 206.

Success of a denial of service attack may also be indicated by a quickly decreasing flow of packets from an addressed network resource (i.e., outbound packets), showing that the resource has indeed been overwhelmed. Thus the monitoring at step 301 in FIG. 6 and calculation at step 303 provide an alternative protection. A determination is made as to whether the rate of change of outbound packet flow meets an established boundary condition at 305. If it falls below, as determined at 307, then the NP rule set is modified at step 309 to increase the discard of inbound packets or redirect inbound packets to a predetermined acceptable alternative network resource. If the rate of change of outbound packet flow is above the boundary condition, then the system returns to step 303. Subsequent to the modification of the rule set following step 309, the system returns to the calculation of a derivative at step 303 and, when the rate of change of outbound packet flow rises above a second boundary condition, the NP rule set is modified to restore normal data flow by decreasing the discard as at step 311. It will be noted that the more generic step of "modify NP rule" at 206 of FIG. 5 may include the more detailed steps shown in FIG. 6 or other equivalent steps.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
  a network resource server having at least one computer system comprising a central processing unit and server memory; and
  a network processor coupled to said network resource server comprising:
    a plurality of interface processors;
    instruction memory for storing instructions accessibly to said interface processors;
    data memory for storing data passing through said network processor to and from said network resource server accessibly to said interface processors; and
    a plurality of input/output ports;
      one of said input/output ports adapted for exchanging data passing through said network processor with an external network under the direction of said interface processors;

at least one other of said input/output ports adapted for exchanging data passing through said network processor with said network resource server;

said network processor and said network resource server cooperating in directing the exchange of data between said input/output ports and the flow of data through said data memory to and from said network resource server in response to execution by said interface processors of instructions loaded into said instruction memory;

said network processor further comprising at least one rate monitor for monitoring the rate of data flow addressed from any source to said network resource server, at least one of said interface processors comprising a component for computing a derivative of data flow rate over time to determine the rate of change of data flow, and at least one modifier for modifying the instructions loaded into said instruction memory in response to the determined rate of change.

2. Apparatus according to claim 1 wherein said at least one interface processor further comprises means for comparing said determined rate of change to at least one predetermined boundary and wherein said modifier modifies the instruction when the rate of change has a prespecified relationship to said at least one predetermined boundary.

3. Apparatus according to claim 1 wherein said network processor comprises a semiconductor substrate and further wherein said interface processors, said instruction memory, said data memory and said input/output ports are formed on said semiconductor substrate.

4. Apparatus according to claim 1 wherein said network processor is adapted to process communication protocols and to exchange application data to be processed by said computer system with said network resource server.

5. Apparatus according to claim 4 wherein said network resource server has a plurality of computer systems serving diverse purposes and said network processor directs application data to an appropriate one of said computer systems for exercising the data in accordance with the appropriate purpose therefor.

6. Apparatus according to claim 4 wherein said network resource server has a plurality of computer systems serving a common purpose and said network processor directs application data to varying ones of said computer systems for exercising the data in a predetermined flow among said computer systems.

7. Apparatus according to claim 1 wherein the number of said interface processors exceeds four.

8. Apparatus according to claim 2 wherein said at least one rate monitor of said network processor monitors data flow inbound toward said network resource server and said at least one modifier increases the discard of inbound data upon the rate of change of inbound data exceeding a predetermined boundary.

9. Apparatus according to claim 2 wherein said at least one modifier of said network processor decreases the discard rate of inbound data upon the rate of change of inbound data falling below a second predetermined boundary.

10. A method in an apparatus comprising:
a network resource server comprising at least one computer system which has a central processing unit and server memory; and
a network processor coupled to said network resource server and comprising:
a plurality of interface processors;
instruction memory for storing instructions accessibly to said interface processors;
data memory for storing data passing through said network processor to and from said network resource server accessibly to said interface processors; and
a plurality of input/output ports;
one of said input/output ports adapted for exchanging data passing through said network processor with an external network under the direction of said interface processors;
at least one other of said input/output ports adapted for exchanging data passing through said network processor with said network resource server;

said method comprising the steps of:
said network processor cooperating with said network resource server in directing the exchange of data between said input/output ports and the flow of data through said data memory to and from said network resource server in response to execution by said interface processors of instructions loaded into said instruction memory;
monitoring the rate of data flow inbound toward said network resource server from all data sources, and
at least one of said interface processors computing a derivative of data flow rate over time to determine the rate of change of data flow from all data sources to said network resource server, and
said at least one modifier modifying the instructions loaded into said instruction memory in response to the determined rate of change.

11. The method according to claim 10 wherein said at least one interface processor further comprises means for comparing said determined rate of change to at least one predetermined boundary and wherein said modifier modifies the instruction when the rate of change has a prespecified relationship to said at least one predetermined boundary.

12. The method according to claim 10 wherein said network processor comprises a semiconductor substrate and further wherein said interface processors, said instruction memory, said data memory and said input/output ports are formed on said semiconductor substrate.

13. The method according to claim 10 wherein said network processor is adapted to process communication protocols and exchanges with said network resource server application data to be processed by said server.

14. The method according to claim 12 wherein said network resource server comprises a plurality of computer systems serving diverse purposes and said network processor directs application data to the appropriate one of said systems for exercising the data in accordance with the appropriate purpose therefor.

15. The method according to claim 12 wherein said network resource server comprises a plurality of computer systems serving a common purpose and said network processor directs application data to varying ones of said computer systems for exercising the data in a predetermined flow in said computer systems.

16. The method according to claim 10 wherein the number of said interface processors exceeds four.

17. The method according to claim 11 wherein said at least one rate monitor of said network processor monitors data f low inbound to said network resource server and said modifier decreases the discard of inbound data upon the rate of change of inbound data rising above a predetermined boundary.

18. The method according to claim 11 wherein said modifier of said network processor decreases the discard rate of inbound data upon the rate of change of inbound data falling below above a second predetermined boundary.

19. A program storage device, readable by machine, tangibly embodying a program of instructions executable by the machine to, in an apparatus comprising a network resource server having at least one computer system comprising at least a central processing unit and server memory; and a network processor coupled to said network resource server comprising:

A plurality of interface processors;

Instruction memory for storing instructions accessible to said interface processors;

Data memory for storing data passing through said network processor to and from said network resource server accessibly to said interface processors; and A plurality of input/output ports;

One of said input/output ports adapted for exchanging data passing through said network processor with an external network under the direction of said interface processors;

At least one other of said input/output ports adapted for exchanging data passing through said network processor with said network resource server;

Said method comprising the steps of:

Said network processor cooperating with said network resource server in directing the exchange of data between said input/output ports and the flow of data through said data memory to said network resource server in response to execution by said interface processors of instructions loaded into said instruction memory;

Said network processor monitoring the rate of data flow to said network resource server, computing a derivative of data flow rate over time to determine the rate of change of data flow, and modifying the instructions loaded into said instruction memory in response to the determined rate of change.

20. The program storage device according to claim 19 wherein said method further comprises comparing said determined rate of change to at least one predetermined boundary and modifying the instruction when the rate of change has a prespecified relationship to said at least one predetermined boundary.

21. The program storage device according to claim 19 wherein said network processor comprises a semiconductor substrate and further wherein said interface processors, said instruction memory, said data memory and said input/output ports are formed on said semiconductor substrate.

22. The program storage device according to claim 19 wherein said network processor is adapted to process communication protocols and exchange application data to be processed by said network resource server with said network resource server.

23. The program storage device according to claim 22 wherein said network resource server has a plurality of computer systems serving diverse purposes and wherein said network processor directs application data to the appropriate one of said computer systems for exercising the data in accordance with the appropriate purpose therefor.

24. The program storage device according to claim 22 wherein said network resource server has a plurality of computer systems serving a common purpose and said network processor directs application data to varying ones of said computer systems for exercising the data in a predetermined flow among said computer systems.

25. The program storage device according to claim 19 wherein the number of said interface processors exceeds four.

26. The program storage device according to claim 20 wherein said monitoring step comprises monitoring data flow to said network resource server and further comprising increasing the discard of inbound data upon the rate of change of data falling below a predetermined boundary.

27. The program storage device according to claim 20 further comprising decreasing the discard rate of inbound data upon the rate of change of data rising above a second predetermined boundary.

28. A network processor coupled to at least one network resource server and an external network comprising:

a plurality of interface processors;

instruction memory for storing instructions accessibly to said interface processors;

data memory for storing data passing through said network processor to and from said network resource server accessibly to said interface processors; and a plurality of input/output ports;

one of said input/output ports adapted for exchanging data passing through said network processor with an external network under the direction of said interface processors;

at least one other of said input/output ports adapted for exchanging data passing through said network processor with said network resource server;

said network processor and said network resource server cooperating in directing the exchange of data between said input/output ports and the flow of data through said data memory to and from said network resource server in response to execution by said interface processors of instructions loaded into said instruction memory;

said network processor further comprising at least one rate monitor for monitoring the rate of data flow addressed to said network resource server from all data sources, at least one of said interface processors comprising a component for computing a derivative of data flow rate over time to determine the rate of change of data flow, and at least one modifier for modifying the instructions loaded into said instruction memory in response to the determined rate of change.

* * * * *